(12) United States Patent
Yang et al.

(10) Patent No.: US 9,500,336 B2
(45) Date of Patent: Nov. 22, 2016

(54) LAMP FOR VEHICLE

(71) Applicants: Hyundai Motor Company, Seoul (KR); SL Corporation, Daegu (KR)

(72) Inventors: Jeong Gyu Yang, Yongin-Si (KR); Sun Tae Kim, Gwangju (KR)

(73) Assignees: Hyundai Motor Company, Seoul (KR); SL Corporation, Daegu (KR)

( * ) Notice: Subject to any disclaimer, the term of this patent is extended or adjusted under 35 U.S.C. 154(b) by 188 days.

(21) Appl. No.: 14/550,957

(22) Filed: Nov. 22, 2014

(65) Prior Publication Data

US 2016/0040846 A1 Feb. 11, 2016

(30) Foreign Application Priority Data

Aug. 7, 2014 (KR) ........................ 10-2014-0101717

(51) Int. Cl.
*F21S 8/10* (2006.01)
*G02B 5/32* (2006.01)

(52) U.S. Cl.
CPC .............. *F21S 48/13* (2013.01); *F21S 48/214* (2013.01); *F21S 48/2212* (2013.01); *F21S 48/23* (2013.01); *G02B 5/32* (2013.01)

(58) Field of Classification Search
CPC ........ F21S 48/13; F21S 48/23; G01J 3/0208; G01J 3/0218; G01J 3/2823; G01J 3003/2826; H04N 5/332; H04N 5/2254
See application file for complete search history.

(56) References Cited

U.S. PATENT DOCUMENTS

| 5,101,193 A | * | 3/1992 | Smith | B60Q 1/302 340/468 |
| 5,495,227 A | * | 2/1996 | Wreede | B60Q 1/302 340/479 |
| 5,708,519 A | * | 1/1998 | Yamamoto | B60Q 1/302 340/479 |

FOREIGN PATENT DOCUMENTS

| JP | 06-275114 A | 9/1994 |
| JP | 7-32938 A | 2/1995 |
| JP | 07-235202 A | 9/1995 |
| JP | 08-216778 A | 8/1996 |
| KR | 10-2008-0112523 A | 12/2008 |
| KR | 10-2012-0038201 A | 4/2012 |
| KR | 10-2012-0068687 A | 6/2012 |

* cited by examiner

*Primary Examiner* — Stephen F Husar
(74) *Attorney, Agent, or Firm* — Morgan, Lewis & Bockius LLP

(57) ABSTRACT

A lamp for a vehicle may include a hologram reproducing apparatus reproducing a written image to an outside when light is input, a light source provided to one end side of the hologram reproducing apparatus, and a reflecting apparatus provided to another end side of the hologram reproducing apparatus and reflecting light of the light source to the hologram reproducing apparatus at a same incident angle as an incident angle when an image is written on the hologram reproducing apparatus.

10 Claims, 5 Drawing Sheets

LAMP FOR VEHICLE

CROSS REFERENCE TO RELATED APPLICATION

The present application claims priority to Korean Patent Application No. 10-2014-0101717, filed Aug. 7, 2014, the entire contents of which is incorporated herein for all purposes by this reference.

BACKGROUND OF THE INVENTION

Field of the Invention

The present invention relates to a lamp for a vehicle, and more particularly, to a lamp for a vehicle including a reproducing unit for reproducing a hologram image.

Description of Related Art

A headlight and a taillight of a vehicle according to the related art have been used as units simply irradiating light to a front of the vehicle to cause a driver to secure front visibility or providing a notice when the vehicle is braked. However, as needs of a customer for exterior esthetics of the vehicle are recently increased, various forms of vehicle lighting apparatuses have been developed.

As an example, a conventional art entitled "VSTOP LED LAMP" attempts to improve esthetics for the taillight of the vehicle by installing a plurality of LED electrodes and configuring the plurality of LED electrodes to be sequentially turned on and display a brake lamp by a flicker when a brake is operated.

However, as described above, in the case in which a light emitting image is implemented using a plurality of light sources, since excessively many light sources are required, it may be disadvantageous in cost and productivity may be degraded due to a complex structure, and there were several limits such as only a limited image is implemented as the light emitting image, and the like.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lamp for a vehicle including a hologram film on which an image is written to implement the image and having an irradiating unit providing light to the hologram film so that the image on the hologram film may be reproduced.

According to various aspects of the present invention, a lamp for a vehicle may include a hologram reproducing apparatus reproducing a written image to an outside when light is input, a light source provided to one end side of the hologram reproducing apparatus, and a reflecting apparatus provided to another end side of the hologram reproducing apparatus and reflecting light of the light source to the hologram reproducing apparatus at a same incident angle as an incident angle when an image is written on the hologram reproducing apparatus.

The reflecting apparatus may form an angle which is set with the hologram reproducing apparatus so that the light of the light source is incident into the hologram reproducing apparatus at the same angle as an incident angle of reference light when being written in the hologram reproducing apparatus.

The light source may be provided to a position out of the hologram reproducing apparatus in one end direction of the hologram reproducing apparatus.

The lamp for the vehicle may further include a light source seating apparatus having the light source installed therein, and a fixing protrusion formed to protrude from the light source seating apparatus and having a protruded end portion coupled to one end of the hologram reproducing apparatus.

The fixing protrusion may protrude to be higher than the light source so that the light generated from the light source is not directly irradiated to the hologram reproducing apparatus.

The reflecting apparatus may have a reflecting surface formed in a plane.

A distance from the light source to the reflecting apparatus may be set so that a moving distance of the light passing from the light source to the reflecting apparatus and incident into the hologram reproducing apparatus becomes equal to a moving distance of light irradiated from reference light when being written in the hologram reproducing apparatus.

The reflecting apparatus may be formed so that a reflecting surface thereof has a set curvature.

The reflecting apparatus may have the curvature which is formed so that all incident angles of the light reflected from the reflecting apparatus and incident into the hologram reproducing apparatus form a set angle.

The hologram reproducing apparatus may have a front surface directing toward an outside of the vehicle, and the reflecting apparatus and the light source may irradiate the light to a rear surface of the hologram reproducing apparatus.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
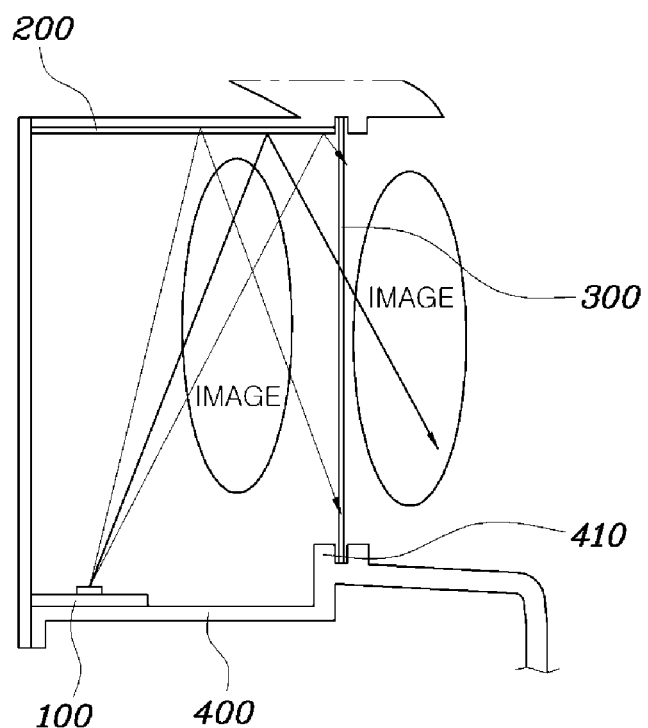
FIG. 1 is a configuration view of an exemplary lamp for a vehicle according to the present invention.
Figure 2:
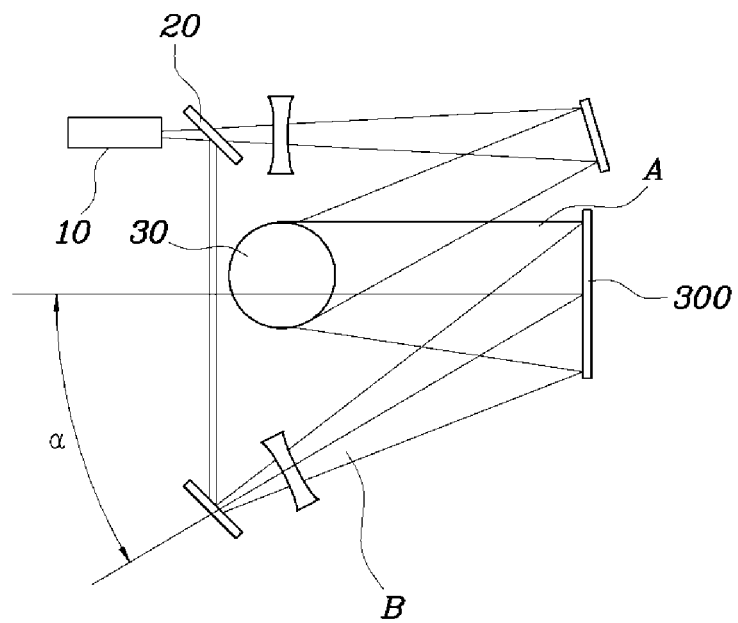
FIG. 2 is a view showing a writing method of a hologram reproducing unit according to the related art.
Figure 3:
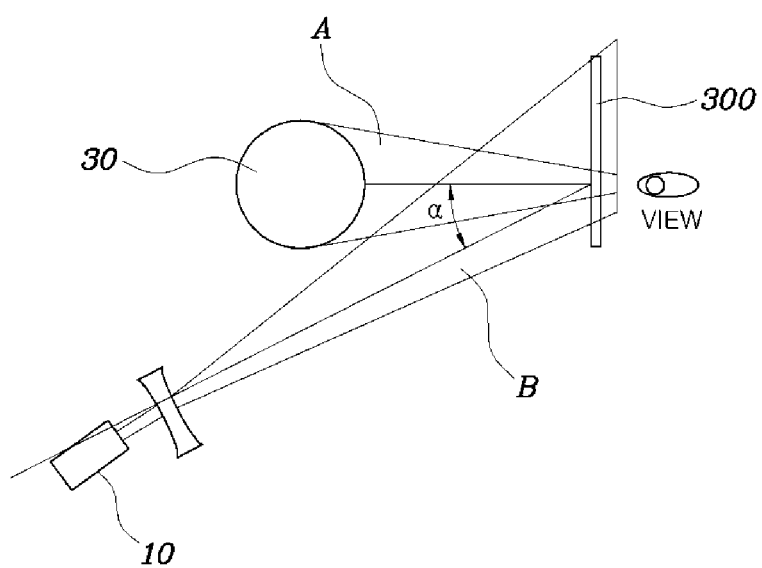
FIG. 3 is a view showing a reproducing method of the hologram reproducing unit according to the related art.
Figure 4:
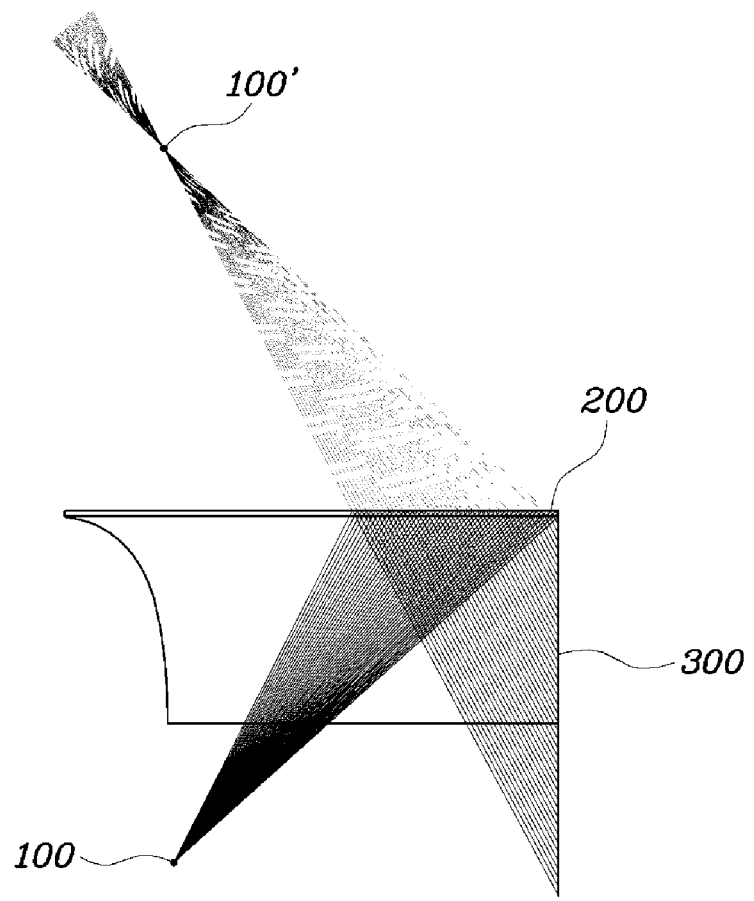
FIG. 4 is a view showing a moving path of light in the exemplary lamp for the vehicle according to the present invention.
Figure 5:
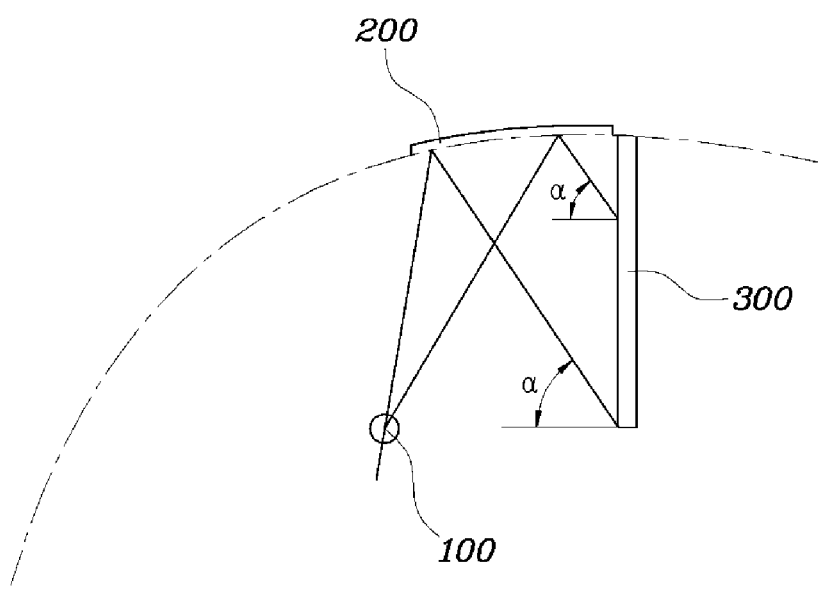
FIG. 5 is a configuration view of an exemplary lamp for a vehicle according to the present invention.

FIG. 1 is a configuration view of a lamp for a vehicle according to various embodiments of the present invention, FIG. 2 is a view showing a writing method of a hologram reproducing unit according to the related art, FIG. 3 is a view showing a reproducing method of the hologram reproducing unit according to the related art, FIG. 4 is a view showing a moving path of light in various embodiments of the present invention, and FIG. 5 is a configuration view of a lamp for a vehicle according to various embodiments of the present invention.

As shown in FIG. 1, the lamp for the vehicle according to various embodiments of the present invention includes a hologram reproducing unit 300 reproducing a written image to the outside when light is input; a light source 100 provided to one end side of the hologram reproducing unit 300; and a reflecting unit 200 provided to the other end side of the hologram reproducing unit 300 and reflecting light from the light source 100 to the hologram reproducing unit 300 at the same incident angle as an incident angle when the image is written on the hologram reproducing unit 300.

Specifically, the hologram reproducing unit 300, which is a photographic plate capable of writing a hologram image, may include a film or a board having a holography sensitive material applied thereon to write an image of irradiated light.

For reference, describing a hologram writing method according to the related art with reference to FIG. 2, if coherent light from a light source 10 is divided into two beams by a beam splitter 20 and one beam of them irradiates a subject 30, then light diffused-reflected from a surface of the subject 30 arrives a hologram reproducing unit 300. The above-mentioned beam is referred to as an objective light A. The other beam is diffused with a lens and is directly irradiated to one surface of the hologram reproducing unit 300 at a set angle (α). The above-mentioned beam is referred to as a reference light B. As a result, the objective light A and the reference light B cause an interference phenomenon with each other on the hologram reproducing unit 300 to thereby generate very fine and complex interference fringes of about 500 to 1,500 per 1 mm. Here, the interference fringes become a written image of the hologram reproducing unit 300.

In the case in which the beam such as the reference light B from the light source 10 as shown in FIG. 3 is irradiated to the hologram image generated as described above at the same set angle (α), the interference fringes serve as a diffraction grating, such that light is diffracted at a position different from a direction into which the reference light B is incident. An aggregation of the above-mentioned diffracted light looks like light reflected and generated from an initial object. By the above-mentioned configuration, the initial objective light A is reproduced from the hologram reproducing unit 300. Therefore, when looking into a reproduced wave front, although the initial object 30 is viewed, the initial object 30 looks as if it is present in a far inside. If a viewing point is again moved, then a position at which the object is viewed is also changed. Therefore, the object looks as if a stereoscopic photograph is viewed.

As described above, in order to reproduce the written hologram, it is important to irradiate the incident light at the same angle as the reference light when being written. In the case in which the light of the light source is directly irradiated to the hologram, as a size of the hologram is increased, a distance between the light source and the hologram reproducing unit also has no choice but to be increased. Therefore, it is difficult to apply the distance between the light source and the hologram reproducing unit to match a layout of the vehicle.

Therefore, as shown in FIG. 1, in the lamp for the vehicle according to various embodiments of the present invention, the light source 100 is disposed at one end side of the hologram reproducing unit 300 and the reflecting unit 200 is disposed at the other end side of the hologram reproducing unit 300, such that the light generated from the light source 100 is reflected by the reflecting unit 200 and is then irradiated to the hologram reproducing unit 300, thereby making it possible to implement the lamp by the hologram while reducing a total layout.

Meanwhile, the reflecting unit 200 may form an angle set by an experiment with the hologram reproducing unit 300 so that the light of the light source 100 is incident into the hologram reproducing unit 300 at the same angle as an incident angle of the reference light when being written in the hologram reproducing unit 300.

The reflecting unit 200 may have a reflecting surface formed in a plane to become a plane reflector. In this case, in a state in which the reflecting unit 200 is disposed to be perpendicular to the hologram reproducing unit 300, the position of the light source 100 is set, such that the light of the light source 100 may be incident into the hologram reproducing unit 300 at the same angle as the incident angle of the reference light.

In addition, a distance from the light source 100 to the reflecting unit 200 may be set so that a moving distance of the light passing from the light source 100 to the reflecting unit 200 and incident into the hologram reproducing unit 300 becomes equal to a moving distance of the light irradiated from the reference light when being written in the hologram reproducing unit 300. In this case, as the distance from the light source 100 to the reflecting unit 200 is decreased, a range of light supplied to the hologram reproducing unit 300 is reduced, and on the contrary, as the distance from the light source 100 to the reflecting unit 200 is increased, the light having an angle different from the incident angle when being written is incident, such that the written image may not be fully reproduced. Therefore, the position of the light source 100 is preferably set so that the light source 100 is positioned at a position which is symmetrical with a light source 100' of the reference light based on the reflecting unit 200 when virtually drawing the light irradiated from the reference light, as shown in FIG. 4.

Meanwhile, the light source 100 may be provided to an outside out of the hologram reproducing unit 300 in one end direction farther than one end of the hologram reproducing unit 300. By the above-mentioned configuration, it is possible to prevent the light generated from the light source 100 from being directly irradiated to the hologram reproducing unit 300.

More specifically, the lamp for the vehicle according to various embodiments of the present invention may further include a light source seating unit 400 provided to one end side of the hologram reproducing unit 300 and having the light source 100 installed therein, and a fixing protrusion 410 formed to protrude from the light source seating unit 400 and having a protruded end portion coupled to one end of the hologram reproducing unit 300. The fixing protrusion 410 preferably protrudes to be higher than the light source 100 so that the light generated from the light source 100 is not directly irradiated to the hologram reproducing unit 300. Therefore, it is possible to prevent light irradiated to a side among the lights generated from the light source 100 from being directly irradiated to the hologram reproducing unit 300, thereby making it possible to reproduce a clear image.

Meanwhile, a lamp for a vehicle according to various embodiments of the present invention is different from previously described embodiments only in a form of a reflecting surface, and other configurations, for example, the light source 100, the light source seating unit 400, the fixing protrusion 410, and the like may be configured to be the same as that of the previously described embodiments of the present invention.

Specifically, the reflecting unit 200 according to the various embodiments of the present invention may be formed so that the reflecting surface has a set curvature. In this case, the reflecting unit 200 preferably has the curvature which is formed so that all incident angles (α) of the light reflected from the reflecting unit 200 and incident into the hologram reproducing unit 300 form an equally set angle. That is, the curvature may be set so that a focus of a parabola of the reflecting unit 200 becomes the light source 100. In this case, the set angle is preferably an angle allowing the hologram to be reproduced.

By using a curved reflecting unit 200, a position setting of the light source 100 may be freer than a case in which the plane reflector is used. The reason is that the curvature of the reflecting unit 200 may be partially changed.

Meanwhile, the light source 100 in the lamp for the vehicle according to various embodiments of the present invention may be an LED or laser. Of course, the lamp for the vehicle is not necessarily limited thereto.

In addition, the hologram reproducing unit 300 has a front surface directing toward an outside of the vehicle and the reflecting unit 200 and the light source 100 irradiate the light to a rear surface of the hologram reproducing unit 300, such that the light transmits to a front of the hologram reproducing unit 300, thereby making it possible to secure more light amount than a case in which the light reflected from the hologram reproducing unit 300 exits to the outside. Therefore, for example, in case of using the lamp for the vehicle as a rear lamp, a function as the lamp may be sufficiently performed and the hologram image may also be reproduced.

According to the lamp for the vehicle having the structure as described above, the image may be implemented with a relatively small number of light sources as compared to a scheme implementing the light emitting image using the plurality of light sources, such that cost may be reduced and man-hour of a work may be reduced.

In addition, since the image written on the hologram reproducing unit is reproduced in implementing the image, various forms and shapes of images may be implemented and a 3 dimensional (3D) image may be implemented.

In addition, the light irradiated to the hologram reproducing unit transmits the hologram reproducing unit and is then recognized by a human eye, such that a light amount much than a case in which the image is reproduced by reflecting the light to the image may be exposed, thereby making it possible to secure visibility.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lamp for a vehicle comprising:
    a hologram reproducing apparatus reproducing a written image to an outside when light is input;
    a light source provided to one end side of the hologram reproducing apparatus; and
    a reflecting apparatus provided to another end side of the hologram reproducing apparatus and reflecting light of the light source to the hologram reproducing apparatus at a same incident angle as an incident angle when an image is written on the hologram reproducing apparatus.

2. The lamp for the vehicle of claim 1, wherein the reflecting apparatus forms an angle which is set with the hologram reproducing apparatus so that the light of the light source is incident into the hologram reproducing apparatus at a same angle as an incident angle of reference light when being written in the hologram reproducing apparatus.

3. The lamp for the vehicle of claim 1, wherein the light source is provided to a position out of the hologram reproducing apparatus in one end direction of the hologram reproducing apparatus.

4. The lamp for the vehicle of claim 1, further comprising:
    a light source seating apparatus having the light source installed therein; and
    a fixing protrusion formed to protrude from the light source seating apparatus and having a protruded end portion coupled to one end of the hologram reproducing apparatus.

5. The lamp for the vehicle of claim 4, wherein the fixing protrusion protrudes to be higher than the light source so that the light generated from the light source is not directly irradiated to the hologram reproducing apparatus.

6. The lamp for the vehicle of claim 1, wherein the reflecting apparatus has a reflecting surface formed in a plane.

7. The lamp for the vehicle of claim 6, wherein a distance from the light source to the reflecting apparatus is set so that a moving distance of the light passing from the light source to the reflecting apparatus and incident into the hologram reproducing apparatus becomes equal to a moving distance of light irradiated from reference light when being written in the hologram reproducing apparatus.

8. The lamp for the vehicle of claim 1, wherein the reflecting apparatus is formed so that a reflecting surface thereof has a set curvature.

9. The lamp for the vehicle of claim 8, wherein the reflecting apparatus has the curvature which is formed so that all incident angles of the light reflected from the reflecting apparatus and incident into the hologram reproducing apparatus form a set angle.

10. The lamp for the vehicle of claim 1, wherein the hologram reproducing apparatus has a front surface directing toward an outside of the vehicle, and the reflecting apparatus and the light source irradiate the light to a rear surface of the hologram reproducing apparatus.

* * * * *